United States Patent
Yan et al.

(10) Patent No.: US 12,111,468 B2
(45) Date of Patent: Oct. 8, 2024

(54) NEAR-TO-EYE DISPLAY DEVICE AND WEARABLE APPARATUS

(71) Applicant: BOE TECHNOLOGY GROUP CO., LTD., Beijing (CN)

(72) Inventors: Meng Yan, Beijing (CN); Qiuyu Ling, Beijing (CN); Wei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 650 days.

(21) Appl. No.: 17/309,834

(22) PCT Filed: Dec. 29, 2020

(86) PCT No.: PCT/CN2020/140894
§ 371 (c)(1),
(2) Date: Jun. 22, 2021

(87) PCT Pub. No.: WO2021/169576
PCT Pub. Date: Sep. 2, 2021

(65) Prior Publication Data
US 2022/0308349 A1    Sep. 29, 2022

(30) Foreign Application Priority Data

Feb. 24, 2020  (CN) .......................... 202010111334.1

(51) Int. Cl.
*G02B 3/00* (2006.01)
*G02B 7/02* (2021.01)
(Continued)

(52) U.S. Cl.
CPC ....... *G02B 27/0172* (2013.01); *G02B 3/0056* (2013.01); *G02B 3/0062* (2013.01);
(Continued)

(58) Field of Classification Search
CPC .... G02B 27/01; G02B 27/0172; G02B 27/12; G02B 3/0056; G02B 3/0062; G02B 7/021;
(Continued)

(56) References Cited

U.S. PATENT DOCUMENTS 6,043,800 A    3/2000  Spitzer et al.
6,381,072 B1 *  4/2002  Burger ................. G02B 5/1814
                                                359/621
(Continued)

FOREIGN PATENT DOCUMENTS

CN    101051143 A    10/2007
CN    102331636 A    1/2012
(Continued)

OTHER PUBLICATIONS

First Office Action dated Feb. 19, 2021 corresponding to Chinese application No. 202010111334.1.
(Continued)

*Primary Examiner* — Abdullahi Nur
(74) *Attorney, Agent, or Firm* — Nath, Goldberg & Meyer; Joshua B. Goldberg (57) ABSTRACT

There is provided a near-to-eye display device, including: a pixel island array, a micro-lens array and a filter layer. The pixel island array and the micro-lens array are fixed with respect to and spaced apart from each other, and the micro-lens array includes plural micro-lenses. The pixel island array includes plural pixel islands in one-to-one correspondence with the plural micro-lenses, and each pixel island emits light to the corresponding micro-lens such that the light reach a predetermined viewing position after passing through the corresponding micro-lens. The plural pixel islands emit light of plural colors, and the filter layer includes plural filter portions in one-to-one correspondence (Continued)

with the plural pixel islands. Each filter portion is located between the corresponding pixel island and the corresponding micro-lens, and is close to the corresponding micro-lens. Each filter portion and light emitted by the corresponding pixel island have a same color.

20 Claims, 6 Drawing Sheets

(51) Int. Cl.
  *G02B 27/01* (2006.01)
  *G02B 27/09* (2006.01)
  *G06T 19/00* (2011.01)
(52) U.S. Cl.
  CPC ......... *G02B 7/021* (2013.01); *G02B 27/0101* (2013.01); *G02B 27/0961* (2013.01); *G06T 19/006* (2013.01); *G02B 2027/014* (2013.01); *G02B 2027/0147* (2013.01)
(58) Field of Classification Search
  CPC ............ G02B 27/0101; G02B 27/0961; G02B 2027/014; G02B 2027/0147; G02B 5/201; G02B 2027/0178; G06T 19/006; H04N 13/307; H04N 13/324
  See application file for complete search history.

(56) References Cited

U.S. PATENT DOCUMENTS

| | | | | |
|---|---|---|---|---|
| 2004/0223071 | A1* | 11/2004 | Wells | H01L 27/14627 |
| | | | | 348/340 |
| 2008/0036759 | A1 | 2/2008 | Koike et al. | |
| 2008/0084517 | A1* | 4/2008 | Itou | G02F 1/133555 |
| | | | | 349/62 |
| 2011/0090570 | A1* | 4/2011 | DeCusatis | B29C 45/16 |
| | | | | 264/1.32 |
| 2013/0285885 | A1* | 10/2013 | Nowatzyk | H01L 25/0753 |
| | | | | 345/8 |
| 2014/0370710 | A1 | 12/2014 | Kitamura et al. | |
| 2015/0092027 | A1 | 4/2015 | Nishiwaki | |
| 2015/0097756 | A1 | 4/2015 | Ziarati et al. | |
| 2016/0282626 | A1 | 9/2016 | Border et al. | |
| 2016/0351605 | A1 | 12/2016 | Yang | |
| 2017/0038592 | A1* | 2/2017 | Sudo | G02B 3/0056 |
| 2017/0255020 | A1* | 9/2017 | Tam | G02B 27/0172 |
| 2017/0261748 | A1* | 9/2017 | Powell | G02B 27/283 |
| 2018/0076247 | A1 | 3/2018 | Pang et al. | |
| 2018/0356567 | A1* | 12/2018 | Wang | G02B 27/0172 |
| 2020/0043398 | A1 | 2/2020 | Salazar | |
| 2020/0310184 | A1 | 10/2020 | Imai et al. | |
| 2021/0084284 | A1* | 3/2021 | McEldowney | H04N 13/257 |

FOREIGN PATENT DOCUMENTS

| | | |
|---|---|---|
| CN | 103219350 A | 7/2013 |
| CN | 104777613 A | 7/2015 |
| CN | 204536659 U | 8/2015 |
| CN | 105842906 A | 8/2016 |
| CN | 106019605 A | 10/2016 |
| CN | 106338834 A | 1/2017 |
| CN | 106549026 A | 3/2017 |
| CN | 106990604 A | 7/2017 |
| CN | 107121832 A | 9/2017 |
| CN | 108132559 A | 6/2018 |
| CN | 108345108 A | 7/2018 |
| CN | 108549166 A | 9/2018 |
| CN | 109491092 A | 3/2019 |
| CN | 209265076 U | 8/2019 |
| CN | 110488494 A | 11/2019 |
| CN | 110504279 A | 11/2019 |
| CN | 110634415 A | 12/2019 |
| CN | 110780447 A | 2/2020 |
| CN | 111175982 A | 5/2020 |
| EP | 2012173 A2 | 1/2009 |
| JP | 2004085965 A | 3/2004 |
| WO | 2004023203 A2 | 3/2004 |
| WO | 2007124315 A3 | 11/2007 |

OTHER PUBLICATIONS

Second Office Action dated Oct. 26, 2021 corresponding to Chinese application No. 202010111334.1.
Su Lin, Huang Qi-yu; "Crosstalk in CMOS image sensor and its solutions"; Aug. 27, 2008; School of Microelectronics, Shanghai Jiaotong University, Shanghai 200240, China, with English translation attached.
He Wen-jing, He Chao, Zhu Yuan-zhong; "Design of a Transmission Enhanced Layer for LCD Projector"; Oct. 2009; North Sichuan Medical College, Nanchong Sichuan 637000, China, with English translation attached.
'New LED backlight for LCD', Jun. 2004, with English translation attached.
'Research on Chromaticity Test System of Color Filter Film'; Aug. 2005; Chinese Journal of Liquid Crystals and Displays, with English translation attached.
Third Office Action issued on Feb. 16, 2022 for application No. CN202010111334.1 with English translation attached.

* cited by examiner

NEAR-TO-EYE DISPLAY DEVICE AND WEARABLE APPARATUS

This is a National Phase Application filed under 35 U.S.C. 371 as a national stage of PCT/CN2020/140894, filed Dec. 29, 2020, an application claiming the benefit of Chinese Application No. 202010111334.1, filed Feb. 24, 2020, the content of each of which is hereby incorporated by reference in its entirety.

TECHNICAL FIELD

The present disclosure relates to the field of display technology, and in particular to a near-to-eye display device (which may also be referred to as a near eye display device) and a wearable apparatus.

BACKGROUND

In recent years, near-to-eye display technology is rapidly developing. Virtual Reality (VR) and Augmented Reality (AR) technologies are most representative, and provide excellent audio-visual experience to people. The near-to-eye display technology can project an image directly into eyes of a viewer, thereby obtaining an immersive display experience. In practical applications, a crosstalk easily occurs in light emitted by different portions of a near-to-eye display device.

SUMMARY

The present disclosure is directed to at least solve one of the technical problems in the prior art, and provides a near-to-eye display device and a wearable apparatus.

To achieve the above objects, the present disclosure provides a near-to-eye display device, including, a pixel island array, a micro-lens array and a filter layer, wherein the pixel island array and the micro-lens array are fixed with respect to each other and are spaced apart from each other, the micro-lens array includes a plurality of micro-lenses, the pixel island array includes a plurality of pixel islands in one-to-one correspondence with the plurality of micro-lenses, and each of the plurality of pixel islands is configured to emit light to the corresponding micro-lens such that the light reach a predetermined viewing position after passing through the corresponding micro-lens; the plurality of pixel islands of the pixel island array emit light of a plurality of colors; the filter layer includes a plurality of filter portions in one-to-one correspondence with the plurality of pixel islands, each of the plurality of filter portions is located between the corresponding pixel island and the corresponding micro-lens and is close to the corresponding micro-lens, and a color of each filter portion is the same as the color of light emitted by the corresponding pixel island.

In some embodiments, the near-to-eye display device further includes a transparent substrate, wherein the pixel island array and the micro-lens array are on two opposite sides of the transparent substrate, respectively.

In some embodiments, at least two adjacent filter portions have a gap therebetween, the near-to-eye display device further includes a light shielding structure configured to shield light emitted by the pixel islands towards the gap.

In some embodiments, the light shielding structure includes a first polarizer and a plurality of second polarizers, the first polarizer is in the gap; the plurality of second polarizers are on light emitting surfaces of the pixel islands and are in one-to-one correspondence with the pixel islands, and polarization directions of the first polarizer and each of the second polarizers are perpendicular to each other.

In some embodiments, the light shielding structure includes a light shielding film layer in the gap.

In some embodiments, a material of the light shielding film layer includes a black resin.

In some embodiments, a diameter of each of the micro-lenses is between 30 μm and 10 mm.

In some embodiments, a distance between two adjacent micro-lenses in a same row and a distance between two adjacent micro-lenses in a same column are both between 0 mm and 10 mm.

In some embodiments, a distance between each pixel island and the corresponding micro-lens does not exceed a focal length of the micro-lens.

In some embodiments, each pixel island includes a plurality of pixels, and each of the plurality of pixels includes an organic light-emitting diode device or a micro-light-emitting diode device.

In some embodiments, the near-to-eye display device further includes a base substrate, wherein the micro-lenses are on the base substrate, and the micro-lenses and the filter layer are on two sides of the base substrate, respectively.

In some embodiments, the micro-lenses and the base substrate have a one-piece structure.

The embodiment of the present disclosure further provides a wearable apparatus, which includes the near-to-eye display device provided by the present disclosure.

BRIEF DESCRIPTION OF DRAWINGS

Drawings, which are included to provide a further understanding of the present disclosure and constitute a part of this specification, illustrate the present disclosure together with the detailed description, but do not limit the present disclosure. In the drawings.

DETAIL DESCRIPTION OF EMBODIMENTS

To make the objects, technical solutions and advantages of the embodiments of the present disclosure more clear, the technical solutions of the embodiments of the present disclosure will be clearly and completely described below with reference to the drawings of the embodiments of the present disclosure. Obviously, the described embodiments are only a few (not all) embodiments of the present disclosure. All other embodiments, which may be derived by a person skilled in the art from the described embodiments of the present disclosure without inventive labor, are within the scope of protection of the present disclosure.

The terms used herein to describe embodiments of the present disclosure are not intended to limit and/or define the scope of the present disclosure. For example, unless defined otherwise, technical or scientific terms used in the present disclosure should have a common meaning as understood by a person skilled in the art to which this invention belongs. It should be understood that "first", "second" and the like, as used in the present disclosure, do not denote any order, quantity, or importance, but rather are used to distinguish one element from another. The singular forms "a," "an," or "the" and the like do not denote a limitation of the number of items, but rather denote the presence of at least one item, unless clearly defined in the context otherwise.

At present, mainstream near-to-eye display technologies include: waveguide display technology, free-form surface display technology, integrated imaging optical field display technology and micro-lens-pixel island image surface stitching display technology. The waveguide display is sensitive to the wavelength of incident light, such that dispersion is easy to occur, and a phenomenon such as "ghost images" and the like may occur in a wearing process. In the free-form surface display technology, an overall size of an apparatus is large, and it is difficult to achieve a trade-off between a large field angle and the size of the apparatus. For the integrated imaging optical field display, it is difficult to realize a transmission of external light, and the augmented reality display effect is poor. The micro-lens-pixel island image surface stitching display technology may bring the user a wider visual experience, and is beneficial to realizing lightness and thinness of the apparatus, such that the micro-lens-pixel island image surface stitching display technology becomes an important display technology in the field of augmented display/virtual display in future.

Figure 1:
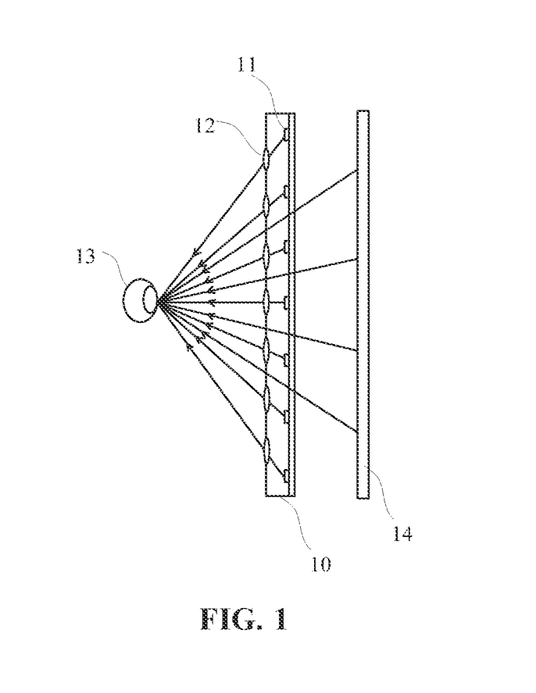
FIG. 1 is a schematic structural diagram of a near-to-eye display device using a micro-lens-pixel island image surface stitching display technology in the related art.

FIG. 1 is a schematic structural diagram of a near-to-eye display device using a micro-lens-pixel island image surface stitching display technology in the related art. As shown in FIG. 1, the near-to-eye display device using the micro-lens-pixel island image surface stitching display technology includes: a micro-lens array disposed on one side of a transparent substrate 10 and a pixel island array disposed on the other side of the transparent substrate, wherein the pixel island array includes a plurality of pixel islands 11, and each pixel island 11 corresponds to a small display screen. The micro-lens array includes a plurality of micro-lenses 12 for imaging, the micro-lenses 12 are in one-to-one correspondence with the pixel islands 11, and light emitted by a pixel island 11 passes through the micro-lens 12 corresponding to the pixel island 11, and then enters a human eye 13, such that the human eye 13 may see (view) a displayed image. The displayed image seen by the human eye 13 is an enlarged virtual image, which is located at a depth of field on a side of the pixel island array 11 distal to the micro-lenses 12. In addition, there is a gap between any two adjacent pixel islands of the plurality of pixel islands 11, and there is a gap between any two adjacent micro-lenses of the plurality of micro-lenses 12, and ambient light may enter the human eye 13 through the gaps between the pixel islands 11 and the gaps between the micro-lenses 12, such that the human eye 13 may see the image displayed by the pixel islands 11 and an external object 14 at the same time, thereby achieving the augmented reality display.

The plurality of pixel islands 11 in the pixel island array may emit light having a plurality of different colors, such as, red, blue, and green (for convenience of description, a pixel island emitting red light is hereinafter referred to as a "red pixel island", a pixel island emitting green light is hereinafter referred to as a "green pixel island", and a pixel island emitting blue light is hereinafter referred to as a "blue pixel island"). At this time, a target image to be displayed may be regarded as an overlay of a red component image, a green component image, and a blue component image. When the near-to-eye display device performs a display, each red pixel island displays a part of the red component image, each green pixel island displays a part of the green component image, and each blue pixel island displays a part of the blue component image. The images displayed by all the red pixel islands may be stitched to form the red component image, the images displayed by all the green pixel islands may be stitched to form the green component image, and the images displayed by all the blue pixel islands may be stitched to form the blue component image. The red component image, the green component image and the blue component image are overlaid on a retina of the human eye 13 to form a complete target image.

Figure 2:
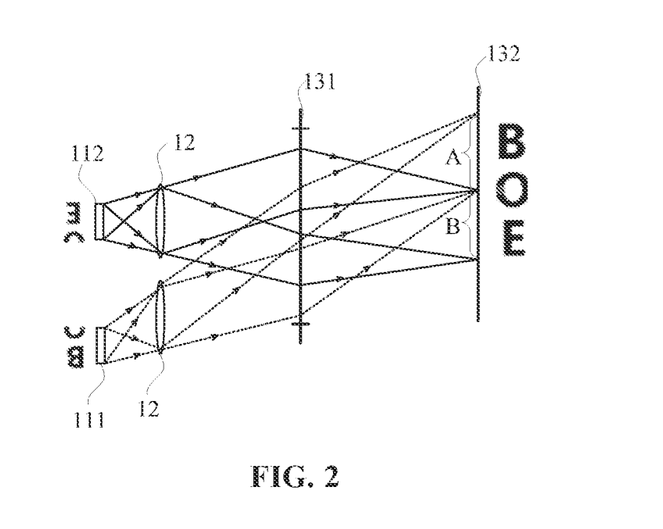
FIG. 2 is a schematic diagram illustrating a principle of displaying an image by stitching different pixel islands of a near-to-eye display device.

The principle of stitching display images of different pixel islands 11 is: light emitted by each point on the pixel island 11 is refracted by the micro-lens 12 to form a beam of parallel light which is emitted to the eye lens and then converged on the retina. For the human eye 13, after two beams of parallel light with a certain width and the same angle enter the human eye 13, the two beams are converged at a same point on the retina; parallel light incident at different angles will converge at different points on the retina. Therefore, by properly controlling the angle of light incident on the eye lens, the images displayed by different pixel islands 11 may be stitched on the retina. FIG. 2 is a schematic diagram illustrating a principle of stitching display images from different pixel islands of a near-to-eye display device. FIG. 2 only illustrates the principle of stitching two pixel islands 111 and 112. It should be understood that in practical applications, the display may be performed by stitching more pixel islands. In order to more clearly represent a schematic diagram of light paths diagram of the light emitted from the two pixel islands 111 and 112, the light emitted from the two pixel islands 111 and 112 in FIG. 2 are represented by solid lines and dotted lines, respectively. As shown in FIG. 2, the pixel island 111 displays an inverted letter "B" and a part of an inverted letter "O", and the pixel island 112 displays another part of the inverted letter "O" and an inverted letter "E". The light emitted by the pixel island 111 passes through the micro-lens 12 and the eye lenses 131 and then falls on an area A of the retina 132, and the light emitted by the pixel island 112 passes through the micro-lens 12 and the eye lenses 131 and then falls on an area B of the retina 132, such that a positive (non-inverted) "BOE" pattern is stitched on the retina 132.

Figure 3:
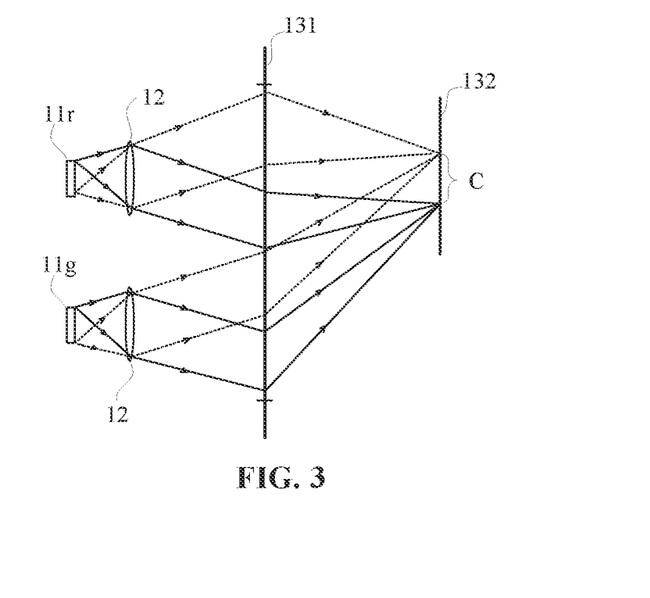
FIG. 3 is a schematic diagram illustrating a principle that images displayed by red and green pixel islands of a near-to-eye display device are overlaid on a retina.

The principle of overlay of the red component image, the green component image and the blue component image on the retina 132 of the human eye 13 is: all the pixel islands 11 in FIG. 1 may be divided into a plurality of groups, each group includes one red pixel island, one green pixel island and one blue pixel island, and an image displayed by the three pixel islands 11 in a same group falls on a same area on the retina 132 to achieve an overlay effect, such that a viewer sees the overlaid image. FIG. 3 is a schematic diagram illustrating the principle that images displayed by red and green pixel islands of a near-to-eye display device are overlaid on a retina FIG. 3 only illustrates the principle of the overlay of the images of the red pixel islands 11r and the green pixel islands 11g. It should be understood that in practical applications, the images displayed by three pixel islands 11 in a same group are overlaid with each other. As shown in FIGS. 1 and 3, the light emitted by the red pixel island 11r passes through the micro-lens 12 and the eye lens 131 and then falls on an area C on the retina 132, and the light emitted by the green pixel island 11g passes through the micro-lens 12 and the eye lens 131 and then also falls on the area C on the retina 132, such that the images displayed by the red pixel island 11r and the green pixel island 11g are overlaid with each other in the area C.

Figure 4:
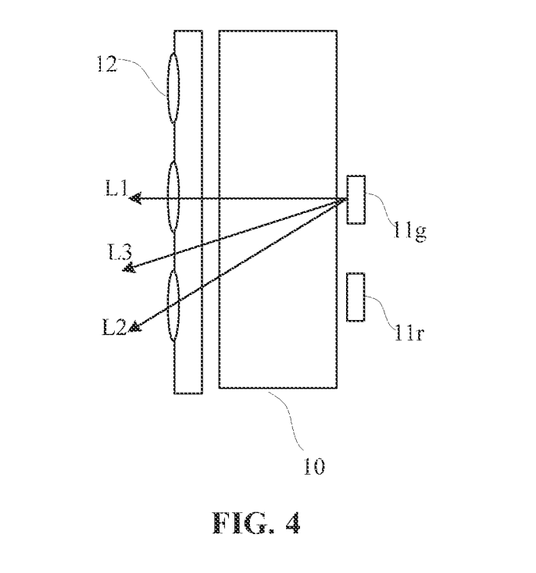
FIG. 4 is a schematic diagram illustrating a crosstalk phenomenon of light occurring in the near-to-eye display device.

However, in the near-to-eye display device shown in FIG. 1, since an angle of light emitted by the pixel island 11 is large, a crosstalk phenomenon will occur in light with different colors, which causes a poor imaging effect and affects user experience. FIG. 4 is a schematic diagram illustrating a crosstalk phenomenon of light occurring in the near-to-eye display device. As shown in FIG. 4, a part of light L1 emitted from the green pixel island 11g will irradiate on the micro-lens 12 corresponding to the green pixel island 11g, and enter the human eye, and the part of light is effective light required for imaging. In addition, a part of the light L2 will irradiate on an adjacent micro-lens 12, and this part of the light will overlay crosstalk of a different color in the resultant image, such that the viewed image has an uneven color distribution. In addition, a part of the light L3 may irradiate on a transparent area between the above two micro-lenses 12, which causes light leakage, and at this time, a bright light ring may be overlaid around the image seen by the user, which affects the user experience.

Figure 5:
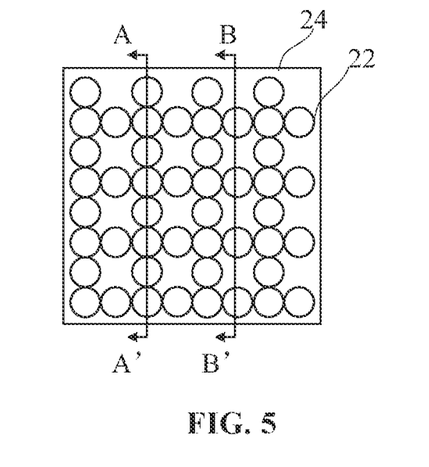
FIG. 5 is a front diagram of a near-to-eye display device according to some embodiments of the present disclosure.
Figure 6:
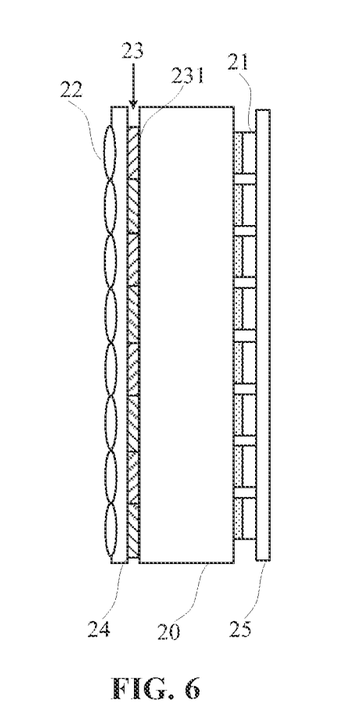
FIG. 6 is a cross-sectional diagram taken along a line AA of FIG. 5 according to some embodiments of the present disclosure.

FIG. 5 is a front diagram of a near-to-eye display device according to some embodiments of the present disclosure. FIG. 6 is a cross-sectional diagram taken along a line AA' of FIG. 5 according to some embodiments of the present disclosure. As shown in FIGS. 5 and 6, the near-to-eye display device includes, a pixel island array, a micro-lens array and a filter layer 23, and the pixel island array and the micro-lens array are fixed with respect to each other and are spaced apart from each other. The micro-lens array includes a plurality of micro-lenses 22, and the plurality of micro-lenses 22 are arranged in a plurality of rows and a plurality of columns.

The pixel island array includes a plurality of pixel islands 21 in one-to-one correspondence with the micro-lenses 22, and each pixel island is configured to emit light to the corresponding micro-lens 22 such that the light reach a predetermined viewing position after passing through the micro-lenses 22. The predetermined viewing position is a position where eyes of a user are located, upon using the near-to-eye display device. The plurality of pixel islands 21 of the pixel island array emit light of (or having or with) a plurality of colors. For example, the plurality of pixel islands 21 of the pixel island array are divided into a plurality of groups, each group includes three pixel islands 21, and the three pixel islands 21 in a same group emit light of red, green, and blue colors, respectively, such that the plurality of pixel islands 21 of the pixel island array emit light of three colors. For example, each group includes four pixel islands 21, and the four pixel islands 21 in a same group emit light of red, green, blue, and yellow colors, respectively, such that the plurality of pixel islands 21 of the pixel island array emit light of four colors.

The filter layer 23 includes a plurality of filter portions (or a plurality of filters) 231 in one-to-one correspondence with the pixel islands 21, each filter portion 231 is located between the corresponding pixel island 21 and the corresponding micro-lens 22 and is disposed close to the micro-lenses 22, and a color of each filter portion 231 is the same as the color of light emitted by the corresponding pixel island 21. It is noted that the filter portion 231 is configured to pass light of a certain color therethrough and filter out light of other colors, and the color of the filter portion 231 is a color of light which passes through the filter portion 231.

Figure 7:
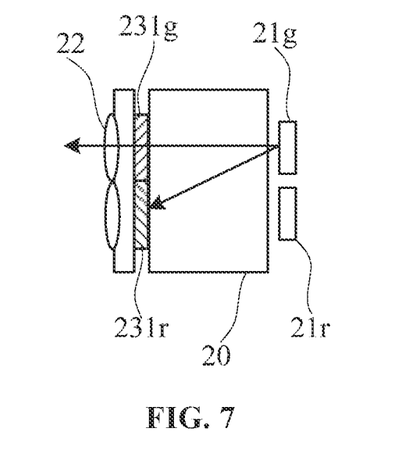
FIG. 7 is a schematic diagram illustrating a principle that a near-to-eye display device eliminates a crosstalk according to an embodiment of the present disclosure.

The embodiment of the present disclosure may prevent the crosstalk from occurring in colors of light emitted by the pixel islands 21 of different colors by the arrangement of the filter layer 23. FIG. 7 is a schematic diagram illustrating the principle that a near-to-eye display device eliminates a crosstalk according to an embodiment of the present disclosure. As shown in FIG. 7, a green filter portion 231g is disposed between a green pixel island 21g and the corresponding micro-lens 22, and a red filter portion 231r is disposed between a red pixel island 21r and the corresponding micro-lens 22, such that green light emitted from the green pixel island 21g may pass through the green filter portion 231g and the corresponding micro-lens 22. When some green light irradiates the red filter portion 231r, the green light is blocked by the red filter portion 231r, thereby preventing the crosstalk.

In some embodiments, the filter portions 231 each is a film layer made of a resin material.

In some embodiments, as shown in FIG. 6, the near-to-eye display device may further include a first base substrate 24 and a second base substrate 25, and the micro-lenses 22 are disposed on the first base substrate 24, the micro-lenses 22 and the filter layer 23 are located on both sides of the first base substrate 24, respectively. The pixel islands 21 are disposed on the second base substrate 25, and devices for controlling the light emission of the pixel islands, such as thin film transistors, electrodes, etc., may be further disposed on the second base substrate 25. It is understood that, in order to allow light from the pixel islands 21 to pass through the micro-lenses 22 into the human eyes, the micro-lenses 22 and the first base substrate 24 are made of a transparent material, for example, SiNx (silicon nitride), silicon oxide (SiOx), SiOxNy (silicon oxynitride), or PMMA (polymethyl methacrylate). Alternatively, the micro-lenses 22 and the first base substrate 24 may have a one-piece structure, that is, the first base substrate 24 and the micro-lenses 22 are formed simultaneously by a single molding process (e.g., injection molding) during the manufacturing process.

In some embodiments, as shown in FIG. 6, the near-to-eye display device further includes: a transparent substrate 20, the pixel island array and the micro-lens array are provided on two opposite sides of the transparent substrate 20, respectively, such that the micro-lens array and the pixel island array may be fixed with respect to each other. The transparent substrate 20 is a substrate having a light transmittance of more than 85%. The material of the transparent substrate 20 is not particularly limited herein. For example, the material of the transparent substrate 20 may be SiNx (silicon nitride), silicon oxide (SiOx), SiOxNy (silicon oxynitride), or PMMA (polymethyl methacrylate). Since PMMA has a small mass, when the material of the transparent substrate 20 is PMMA, it is advantageous to reduce the weight of the near-to-eye display device.

Alternatively, the embodiments of the present disclosure are not limited to the above arrangement, as long as the micro-lens array and the pixel island array may be fixed with respect to each other. For example, a clamp may be further provided around the first base substrate 24 and the second base substrate 25, such that the micro-lens array and the pixel island array may be fixed with respect to each other by using the clamp.

It will be appreciated that a distance between the pixel island 21 and the corresponding micro-lens 22 does not exceed a focal length of the micro-lens 22, such that light emitted by the pixel island 21 irradiates on the micro-lens 22 and then the image displayed by the pixel island 21 is formed as an enlarged virtual image on a side of the pixel island 21 distal to the micro-lens 22. Here, the distance between the pixel island 21 and the corresponding micro-lens 22 is a vertical distance from the pixel island 21 to the corresponding micro-lens 22. When the distance between the pixel island 21 and the corresponding micro-lens 22 is equal to the focal length of the micro-lens 22, a light emitting surface of the pixel island 21 is located on a focal plane of the micro-lens 21. In practical applications, the distance between the pixel island 21 and the corresponding micro-lens 22 may be set to a desired value by setting a thickness of the transparent substrate 20.

In some embodiments, an orthographic projection of the pixel island 21 on the transparent substrate 20 has a square shape. The pixel island 21 includes a plurality of pixels. For example, the pixel island 21 includes 10×10 pixels, and each pixel in a same pixel island 21 may emit light of the same color. Each pixel includes an OLED (Organic Light-Emitting Diode) device or a micro-LED (micro-Light-Emitting Diode) device.

The micro-LED may also be called a micro-LED crystal grain or a micro-LED chip, and mainly includes a p-type semiconductor layer, a light emitting layer and an n-type semiconductor layer which are sequentially stacked. In addition, the micro-LED further includes a p-electrode electrically connected to the p-type semiconductor layer and an n-electrode electrically connected to the n-type semiconductor layer.

The OLED device may generally include an anode, a cathode, and a light emitting functional layer disposed between the anode and the cathode. The light emitting functional layer may specifically include: a hole injection layer, a hole transport layer, a light emitting layer, an electron transport layer, and an electron injection layer.

The shape of the micro-lens 22 in the embodiment of the present disclosure is not particularly limited. The shape of the micro-lens 22 may be circular, square, hexagonal, or the like. Here, the shape of the micro-lens 22 refers to a shape of an orthographic projection of the micro-lens 22 on the transparent substrate 20. The present disclosure will be described taking an example in which the shape of the micro-lens 22 is circular. A diameter of each of the micro-lenses 22 is 30 µm to 10 mm. For example, the diameter of each of the micro-lenses 22 is 500 µm or 1 mm or 2 mm. A distance between two adjacent micro-lenses 22 in a same row and a distance between two adjacent micro-lenses 22 in a same column are both between 0 mm and 10 mm. For example, the distance between two adjacent micro-lenses 22 in a same row and the distance between two adjacent micro-lenses 22 in a same column are 500 µm or 1 mm or 2 mm.

In some embodiments, at least two adjacent micro-lenses 22 have a gap therebetween, and correspondingly, at least two adjacent filter portions 231 also have a gap therebetween, such that ambient light may enter human eyes through the gap between the micro-lenses 22, such that the human eyes 13 may see the image displayed by the pixel islands 21 and an external object at the same time, thereby achieving the augmented reality effect. It is noted that the term "two adjacent micro-lenses 22" in the present disclosure means that there are no other micro-lenses 22 between the two micro-lenses 22; similarly. "two adjacent filter portions 231" means that there are no other filter portion 231 between the two filter portions 231.

An example of an arrangement of the micro-lenses is shown in FIG. 5, in which there is no gap between every two adjacent micro-lenses 22 in each even row, that is, the distance between every two adjacent micro-lenses 22 in each even row is 0. The distance between every two adjacent micro-lenses 22 in each odd row may be equal to the diameter of each of the micro-lenses 22. There is no gap between every two adjacent micro-lenses 22 in each odd column, that is, the distance between every two adjacent micro-lenses 22 in each odd column is 0. The distance between every two adjacent micro-lenses 22 in each even column may be equal to the diameter of each of the micro-lenses 22.

It is understood that the predetermined viewing position, a center of the pixel island 21 and a center of the corresponding micro-lens 22, and a center of the filter portion 231 are located on a same straight line, such that the light emitted from the pixel island 21 to the micro-lens 22 may pass through the filter portion 231. In addition, the arrangement of the filter portions 231 is the same as that of the micro-lenses 22. When a shape of the filter portion 231 is the same as that of the pixel island 21 and both of them are square, in the filter layer 23, there is no gap between every two adjacent filter portions in each even row, that is, the distance between every two adjacent filter portions in each even row is 0. The distance between every two adjacent filter portions 231 in each odd row may be equal to a width of the filter portion 231. There is no gap between every two adjacent filter portions 231 in each odd column, that is, the distance between every two adjacent filter portions 231 in each odd column is 0. The distance between every two adjacent filter portions 231 in each even column may be equal to the width of the filter portion 231.

It should be noted that the number and arrangement of the micro-lenses 22 in FIG. 5 are only exemplary. In practical applications, other numbers and arrangements may also be adopted. In addition, the shape of the filter portion 231 is not limited to the square, and may be the same as that of the micro-lens 22, such as, a circular shape; other shapes, such as hexagonal, etc., may alternatively be used, as long as light emitted by the pixel island 21 toward the corresponding micro-lens 22 may all be received by the filter portion 231.

To eliminate the light leakage in FIG. 4, in some embodiments of the present disclosure, the near-to-eye display device further includes a light shielding structure configured to shield light emitted by the pixel island 21 towards the gap between the filter portions 231.

Figure 8:
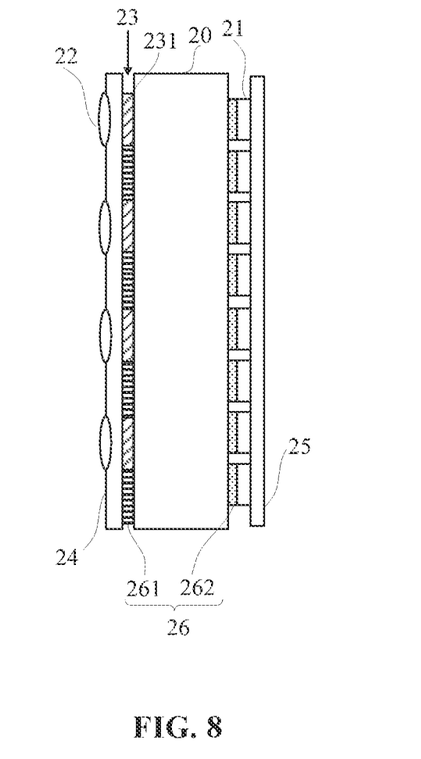
FIG. 8 is a cross-sectional diagram taken along a line BB' of FIG. 5 according to some embodiments of the present disclosure.

FIG. 8 is a cross-sectional diagram taken along a line BB' of FIG. 5 according to some embodiments of the present disclosure. In some embodiments, as shown in FIG. 8, the light shielding structure 26 includes: a first polarizer 261 and a plurality of second polarizers 262. The first polarizer 261 is located in the gap between the filter portions 231; the plurality of second polarizers 262 are disposed on the light emitting surfaces of the pixel islands 21 and are in one-to-one correspondence with the pixel islands 21, and polarization directions of the first polarizer 261 and the second polarizer 262 are perpendicular to each other.

Figure 9:
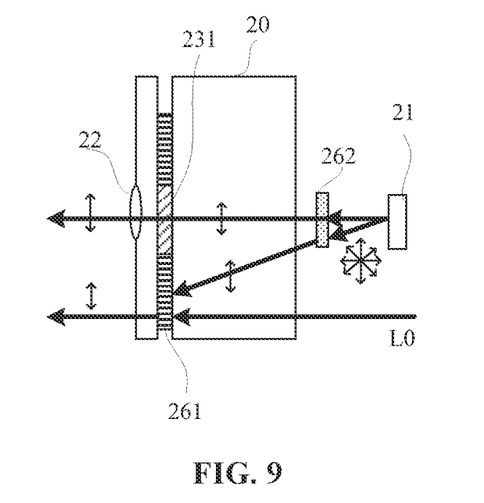
FIG. 9 is a schematic diagram illustrating a principle of eliminating light leakage when a light shielding structure includes a first polarizer and a second polarizer.

FIG. 9 is a schematic diagram of the principle of eliminating light leakage when a light shielding structure includes a first polarizer and a second polarizer. Thick arrows in FIG. 9 indicate light and thin arrows indicate polarization directions of the light. Here, the polarization direction of the second polarizer 262 is a vertical direction in FIG. 9, and the polarization direction of the first polarizer 261 is a direction perpendicular to the paper plane. At this time, the light emitted from the pixel island 21 is polarized by the second polarizer 262 to form polarized light in the vertical direction. Because the filter portion 231 has no selective effect on the polarized light, the polarized light emitted from the second polarizer 262 may pass through the corresponding filter portion 231 and the micro-lens 22 to enter human eyes. The polarized light emitted from the second polarizer 262 will not pass through the first polarizer 261 and thus will be effectively shielded. Meanwhile, external environment light L0 passes through the first polarizer 261 and is converted into polarized light perpendicular to the paper plane, and then enters human eyes. Therefore, the light shielding structure 26 includes the first polarizer 261 and the second polarizers 262, which does not obstruct the human eyes viewing the external environment, such that the augmented reality effect is ensured.

Figure 10:
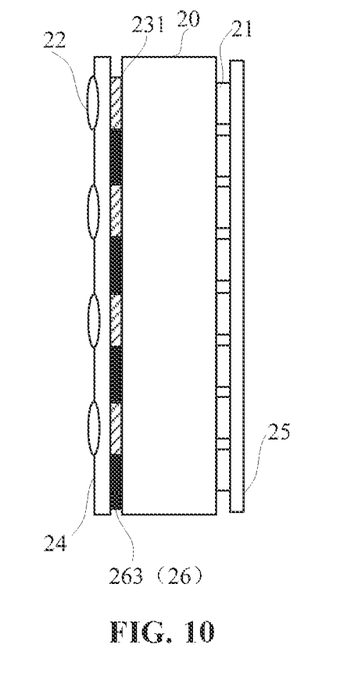
FIG. 10 is a cross-sectional diagram taken along a line BB' of FIG. 5 according to another embodiments of the present disclosure.

FIG. 10 is a cross-sectional diagram taken along a line BB' of FIG. 5 according to another embodiments of the present disclosure. The near-to-eye display device shown in FIG. 10 differs from that shown in FIG. 8 only in that a specific structure of the light shielding structure 26 in FIG. 10 is different from that shown in FIG. 8. In FIG. 10, the light shielding structure 26 includes a light shielding film layer 263 located in the gap between the filter portions 231. Illustratively, a material of the light shielding film layer 263 include: a black resin.

Figure 11:
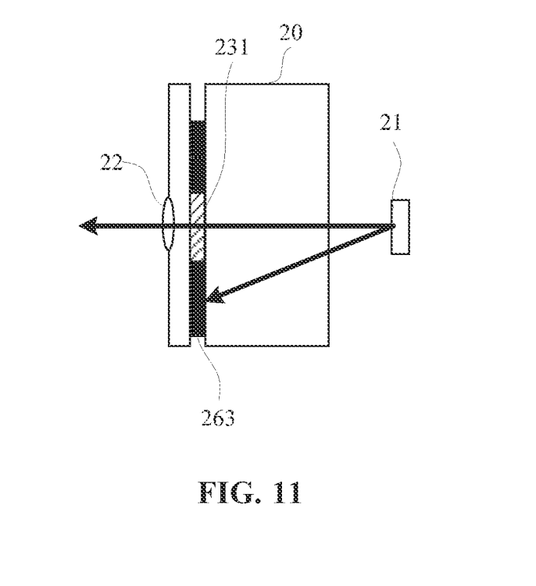
FIG. 11 is a schematic diagram illustrating a principle of eliminating light leakage when a light shielding structure includes a light shielding film layer.

FIG. 11 is a schematic diagram illustrating the principle of eliminating light leakage when a light shielding structure includes a light shielding film layer. As shown in FIG. 11, some light emitted from the pixel island 21 transmits through the corresponding filter portion 231 and the micro-lens 22 to enter human eyes, and remaining light emitted to the light shielding film layer 231 is shielded.

A process for manufacturing the near-to-eye display device according to the above embodiment will be described below.

For the near-to-eye display device shown in FIG. 8, the manufacturing process may include the following steps. In a first step, a first base substrate 24 and micro-lenses 22 on the first base substrate 24 are prepared. In a second step, a filter material layer (for example, an acrylic resin material) is formed on a side of the first base substrate 24 distal to the micro-lenses; then, a patterning process is performed on the filter material layer, thereby forming a plurality of filter portions 231 in one-to-one correspondence with the micro-lenses 22. In a third step, a first polarizer 261 is attached to the gap between the filter portions 231. In a fourth step, pixel islands 21 are formed on the second base substrate 25, and second polarizers 262 are formed on light emitting surfaces of the pixel islands 21. In a fifth step, the first base substrate 24, a transparent substrate 20 and the second base substrate 25 are fixedly connected together to form the structure shown in FIG. 8.

In the above manufacturing procedure, the filter portions 231 and the first polarizer 261 are formed on the first base substrate 24. Alternatively, the filter portions 231 may be formed on a third base substrate, and then, the first base substrate 24 on which the micro-lenses 22 are formed, the third base substrate on which the filter portions 231 and the first polarizer 261 are formed, the transparent substrate 20, and the second base substrate 25 on which the pixel islands 21 and the second polarizers 262 are formed, are fixedly connected together. Alternatively, the filter portions 231, the first polarizer 261, and the second polarizers 262 may be formed on the transparent substrate 20, and then, the first base substrate 24 on which the micro-lenses 22 are formed, the second base substrate 25 on which the pixel islands 21 are formed, and the transparent substrate 20 on which the filter portions 231, the first polarizer 261, and the second polarizers 262 are formed, are fixed together.

For the near-to-eye display device shown in FIG. 10, the manufacturing procedure is similar to that for the near-to-eye display device shown in FIG. 8. In FIG. 10, the process for attaching the second polarizers 262 needs to be omitted, and the process for attaching the first polarizer 261 needs to be replaced by a process for forming a light shielding film layer 263. The light shielding film layer 263 may be formed by performing a patterning process on a light shielding material, which will not be described in detail herein.

The embodiment of the present disclosure also provides a wearable apparatus, which includes the near-to-eye display device provided in the above embodiment. In addition, the wearable apparatus further includes a housing, and the near-to-eye display device is provided on the housing. The housing may be a helmet.

Since the near-to-eye display device provided in the above embodiment may eliminate crosstalk and light leakage, and improves the imaging effect, the wearable apparatus including the above near-to-eye display device may improve user experience.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. A near-to-eye display device, comprising: a pixel island array, a micro-lens array and a filter layer, wherein the pixel island array and the micro-lens array are fixed with respect to each other and are spaced apart from each other, the micro-lens array comprises a plurality of micro-lenses, the pixel island array comprises a plurality of pixel islands in one-to-one correspondence with the plurality of micro-lenses, and each of the plurality of pixel islands is configured to emit light to a corresponding micro-lens such that the light reach a predetermined viewing position after passing through the corresponding micro-lens; the plurality of pixel islands of the pixel island array emit light of a plurality of colors;

the filter layer comprises a plurality of filter portions in one-to-one correspondence with the plurality of pixel islands, each of the plurality of filter portions is located between a corresponding pixel island and the corresponding micro-lens and is close to the corresponding micro-lens, and a color of each filter portion is the same as the color of light emitted by the corresponding pixel island, and the plurality of micro-lenses of the micro-lens array are arranged in a plurality of rows and a plurality of columns, there is no gap between any adjacent two of the micro-lenses in each even row, a distance between any adjacent two of the micro-lenses in each odd row is equal to a diameter of each of the micro-lenses, there is no gap between any adjacent two of the micro-lenses in each odd column, and a distance between any adjacent two of the micro-lenses in each even column is equal to the diameter of each of the micro-lenses.

2. The near-to-eye display device of claim 1, further comprising a transparent substrate, wherein the pixel island array and the micro-lens array are on two opposite sides of the transparent substrate, respectively.

3. The near-to-eye display device of claim 1, wherein at least two adjacent filter portions have a gap therebetween.

4. The near-to-eye display device of claim 3, further comprising a first polarizer and a plurality of second polarizers, wherein the first polarizer is in the gap; the plurality of second polarizers are on light emitting surfaces of the pixel islands and are in one-to-one correspondence with the pixel islands, and polarization directions of the first polarizer and each of the second polarizers are perpendicular to each other.

5. The near-to-eye display device of claim 3, further comprising a light shielding film layer in the gap.

6. The near-to-eye display device of claim 5, wherein a material of the light shielding film layer comprises a black resin.

7. The near-to-eye display device of claim 1, wherein a diameter of each of the micro-lenses is between 30 μm and 10 mm.

8. The near-to-eye display device of claim 1, wherein a distance between two adjacent micro-lenses in a same row and a distance between two adjacent micro-lenses in a same column are both between 0 mm and 10 mm.

9. The near-to-eye display device of claim 1, wherein a distance between each pixel island and the corresponding micro-lens does not exceed a focal length of the micro-lens.

10. The near-to-eye display device of claim 1, wherein each pixel island of the plurality of pixel islands comprises a plurality of pixels, and each of the plurality of pixels comprises an organic light-emitting diode device or a micro-light-emitting diode device.

11. The near-to-eye display device of claim 1, further comprising a base substrate, wherein the micro-lenses are on the base substrate, and the micro-lenses and the filter layer are on two opposite sides of the base substrate, respectively.

12. The near-to-eye display device of claim 11, wherein the micro-lenses and the base substrate have a one-piece structure.

13. A wearable apparatus, comprising the near-to-eye display device of claim 1.

14. The near-to-eye display device of claim 2, wherein at least two adjacent filter portions have a gap therebetween.

15. The near-to-eye display device of claim 14, further comprising a first polarizer and a plurality of second polarizers, wherein the first polarizer is in the gap; the plurality of second polarizers are on light emitting surfaces of the pixel islands and are in one-to-one correspondence with the pixel islands, and polarization directions of the first polarizer and each of the second polarizers are perpendicular to each other.

16. The near-to-eye display device of claim 2, wherein a diameter of each of the micro-lenses is between 30 μm and 10 mm.

17. The near-to-eye display device of claim 2, wherein a distance between two adjacent micro-lenses in a same row and a distance between two adjacent micro-lenses in a same column are both between 0 mm and 10 mm.

18. The near-to-eye display device of claim 2, wherein a distance between each pixel island and the corresponding micro-lens does not exceed a focal length of the micro-lens.

19. The near-to-eye display device of claim 2, wherein each pixel island of the plurality of pixel islands comprises a plurality of pixels, and each of the plurality of pixels comprises an organic light-emitting diode device or a micro-light-emitting diode device.

20. The near-to-eye display device of claim 2, further comprising a base substrate, wherein the micro-lenses are on the base substrate, and the micro-lenses and the filter layer are on two opposite sides of the base substrate, respectively.

* * * * *